US012083595B2

(12) United States Patent
Guggilapu et al.

(10) Patent No.: US 12,083,595 B2
(45) Date of Patent: Sep. 10, 2024

(54) METHOD AND APPARATUS FOR FORMING OVERHANGING STRUCTURES IN ADDITIVE MANUFACTURED PARTS THAT HAVE AN IMPROVED SURFACE ROUGHNESS

(71) Applicant: ADDITIVE TECHNOLOGIES LLC, Palm City, FL (US)

(72) Inventors: PriyaankaDevi Guggilapu, Durham, NC (US); Benjamin Paulson, Walworth, NY (US); Dinesh Krishna Kumar Jayabal, Cary, NC (US); Collin A. Ladd, Charlotte, NC (US); Stuart A. Schweid, Pittsford, NY (US)

(73) Assignee: Additive Technologies LLC, Palm City, FL (US)

( * ) Notice: Subject to any disclaimer, the term of this patent is extended or adjusted under 35 U.S.C. 154(b) by 0 days.

(21) Appl. No.: 17/664,470

(22) Filed: May 23, 2022

(65) Prior Publication Data

US 2023/0373007 A1  Nov. 23, 2023

(51) Int. Cl.
| | | |
|---|---|---|
| B22F 10/38 | (2021.01) |
| B22F 10/22 | (2021.01) |
| B22F 10/85 | (2021.01) |
| B22F 12/53 | (2021.01) |
| B22F 12/90 | (2021.01) |
| B33Y 10/00 | (2015.01) |
| B33Y 30/00 | (2015.01) |
| B33Y 50/02 | (2015.01) |

(52) U.S. Cl.
CPC ........... *B22F 10/385* (2021.01); *B22F 10/22* (2021.01); *B22F 10/85* (2021.01); *B22F 12/53* (2021.01); *B22F 12/90* (2021.01); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | | | |
|---|---|---|---|---|
| 5,622,216 A | * | 4/1997 | Brown | B33Y 30/00 164/71.1 |
| 5,893,404 A | * | 4/1999 | Mendez | B33Y 10/00 228/257 |
| 8,191,018 B1 | * | 5/2012 | Molesa | H05K 3/0005 700/121 |
| 9,616,494 B2 | | 4/2017 | Vader et al. | |
| 10,040,119 B2 | | 8/2018 | Vader et al. | |
| 2015/0048064 A1 | * | 2/2015 | Cheverton | B23K 26/34 219/121.64 |
| 2016/0059489 A1 | * | 3/2016 | Wang | B29C 64/393 700/119 |
| 2016/0236414 A1 | * | 8/2016 | Reese | B33Y 50/02 |
| 2017/0056970 A1 | * | 3/2017 | Chin | B22D 11/01 |
| 2018/0079193 A1 | * | 3/2018 | Ishida | B29C 64/112 |

(Continued)

*Primary Examiner* — Keith Walker
*Assistant Examiner* — Ryan L Heckman
(74) *Attorney, Agent, or Firm* — Maginot Moore & Beck LLP (57) ABSTRACT

A three-dimensional (3D) metal object manufacturing apparatus is operated to compensate for surface deviations of overhanging features differently than for non-overhanging features. The compensation technique used for the overhanging features depends on whether an edge of the overhanging feature being formed in a next layer has curved or sharp corners.

13 Claims, 10 Drawing Sheets

(56) References Cited

U.S. PATENT DOCUMENTS

| | | | |
|---|---|---|---|
| 2018/0297114 A1* | 10/2018 | Preston | B29C 64/165 |
| 2020/0108441 A1* | 4/2020 | Jones | B33Y 10/00 |
| 2020/0324486 A1* | 10/2020 | Mantell | B29C 64/112 |
| 2021/0096537 A1* | 4/2021 | Mantell | G05B 19/19 |
| 2022/0332040 A1* | 10/2022 | Feinberg | B33Y 70/00 |

\* cited by examiner

METHOD AND APPARATUS FOR FORMING OVERHANGING STRUCTURES IN ADDITIVE MANUFACTURED PARTS THAT HAVE AN IMPROVED SURFACE ROUGHNESS

TECHNICAL FIELD

This disclosure is directed to melted metal ejectors used in three-dimensional (3D) object printers and, more particularly, to the formation of overhanging structures in 3D objects manufactured with those systems.

BACKGROUND

Three-dimensional printing, also known as additive manufacturing, is a process of making a three-dimensional solid object from a digital model of virtually any shape. Many three-dimensional printing technologies use an additive process in which an additive manufacturing device ejects drops or extrudes ribbons of a build material to form successive layers of the part on top of previously deposited layers. Some of these technologies use ejectors that eject UV-curable materials, such as photopolymers or elastomers, while others melt plastic materials to produce thermoplastic material that is extruded to form successive layers of thermoplastic material. These technologies are used to construct three-dimensional objects with a variety of shapes and features. This additive manufacturing method is distinguishable from traditional object-forming techniques, which mostly rely on the removal of material from a work piece by a subtractive process, such as cutting or drilling.

Recently, some 3D object printers have been developed that eject drops of melted metal from one or more ejectors to form 3D metal objects. These printers have a source of solid metal, such as a roll of wire, macro-sized pellets, or metal powder, and the solid metal is fed into a heated receptacle of a vessel in the printer where the solid metal is melted and the melted metal fills the receptacle. The receptacle is made of non-conductive material around which an electrical wire is wrapped to form a coil. An electrical current is passed through the coil to produce an electromagnetic field that causes a drop of melted metal at the nozzle of the receptacle to separate from the melted metal within the receptacle and be propelled from the nozzle. A platform is configured to move in a X-Y plane parallel to the plane of the platform by a controller operating actuators so melted metal drops ejected from the nozzle form metal layers of an object on the platform. The controller operates another actuator to alter the position of the ejector or platform to maintain a constant distance between the ejector and an existing layer of the metal object being formed. This type of metal drop ejecting printer is called a magnetohydrodynamic (MHD) printer.

The surface quality of a 3D printed part needs to be comparable to parts manufactured using a traditional injection molding process. Surface quality of a part made by a 3D metal object printer can be objectively measured. The roughness of an additive manufactured part can affect critical properties like wear resistance, crack initiation, fatigue life, and fluid dynamics. Reducing the roughness of part surfaces is especially critical in mechanical parts like pistons, bearings, and seal surfaces where the interaction between moving surfaces can lead to rapid wear and tear of the parts. In 3D metal object printers, surface roughness scores can differ for different feature types of a part. For example, features formed with overhangs do not have a surface roughness similar to those formed without overhanging features. As used in this document, the term "overhanging feature" means one or more metal drops that extend beyond the perimeter of a previously formed layer. Being able to form metal parts with 3D metal object printers that exhibit roughness scores for metal object overhanging features that are commensurate with roughness scores for non-overhanging features of the part would be beneficial.

SUMMARY

A new method of operating a 3D metal object printer enables the printer to form metal parts that exhibit roughness scores for metal object overhanging features that are commensurate with roughness scores for non-overhanging features of the part. The method includes generating digital image data of an uppermost layer in an object being formed with drops of a material ejected from the drop ejecting apparatus, modifying machine-ready instructions used to operate the drop ejecting apparatus to form an overhanging feature of a next layer of the object using a first correction method and the generated digital image data, modifying machine-ready instructions used to operate the drop ejecting apparatus to form a non-overhanging feature of the next layer of the object using a second correction method and the generated digital image data, the second correction method being different than the first correction method, and executing the modified machine-ready instructions to operate the drop ejecting apparatus to form the next layer of the object.

A new 3D metal object printer can form metal parts that exhibit roughness scores for metal object overhanging features that are commensurate with roughness scores for non-overhanging features of the part. The 3D metal object printer includes an ejector fluidly connected to a source of melted material, a digital image data generator configured to generate digital image data of an uppermost layer of an object being formed with drops of the melted material ejected by the ejector, and a controller operatively connected to the ejector and the digital image data generator. The controller is configured to modify machine-ready instructions used to operate the drop ejecting apparatus to form an overhanging feature of a next layer of the object using a first correction method and the generated digital image data, modify machine-ready instructions used to operate the drop ejecting apparatus to form a non-overhanging feature of the next layer of the object using a second correction method and the generated digital image data, the second correction method being different than the first correction method, and execute the modified machine-ready instructions to operate the drop ejecting apparatus to form the next layer of the object.

BRIEF DESCRIPTION OF THE DRAWINGS

The foregoing aspects and other features of a method of operating a 3D metal object printer that form metal parts with 3D metal object printers that exhibit roughness scores for metal object overhanging features that are commensurate with roughness scores for non-overhanging features of the part are explained in the following description, taken in connection with the accompanying drawings.

DETAILED DESCRIPTION

For a general understanding of the environment for the 3D metal object printer and its operation as disclosed herein as well as the details for the printer and its operation, reference is made to the drawings. In the drawings, like reference numerals designate like elements.

Figure 1:
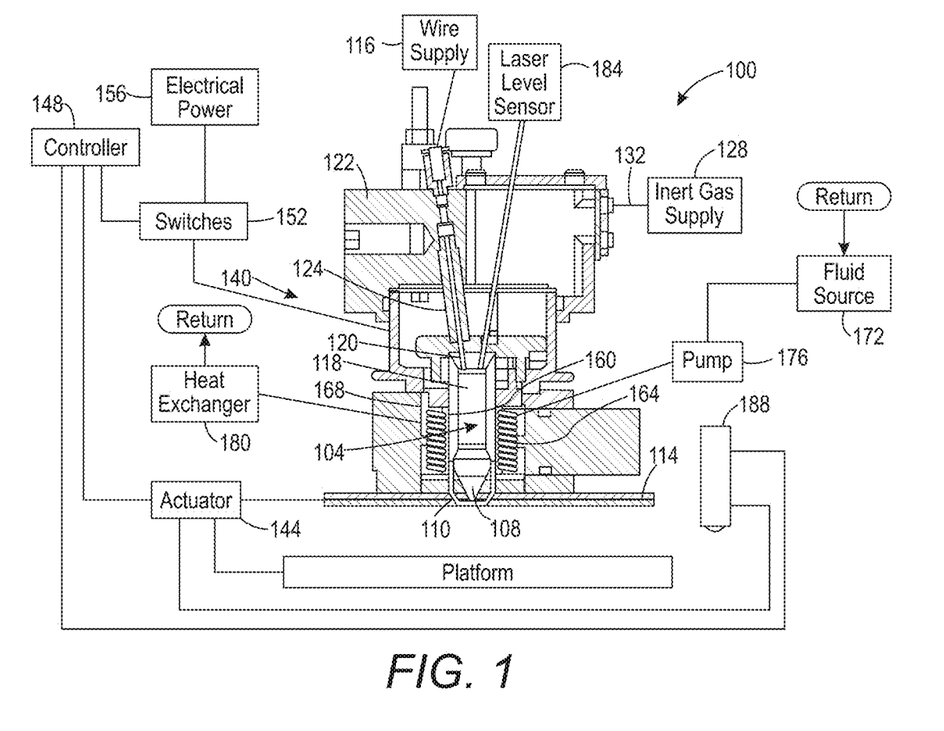
FIG. 1 is a block diagram of a 3D metal printer that forms metal parts with 3D metal object printers that exhibit roughness scores for metal object overhanging features that are commensurate with roughness scores for non-overhanging features of the part.

FIG. 1 illustrates an embodiment of a 3D metal object printer 100 that forms overhanging features with roughness scores that are commensurate with the roughness scores for non-overhanging features. As used in this document, the term "support structures" means formations of metal made with melted metal drops ejected from an ejector head that are later removed from a part formed with other melted metal drops ejected from the ejector head. As used in this document, the term "part" means an object of manufacture made with a 3D metal drop ejecting apparatus. In the printer of FIG. 1, drops of melted bulk metal are ejected from a receptacle of a removable vessel 104 having a single nozzle 108 to form layers of the manufactured object on a build platform 112. As used in this document, the term "removable vessel" means a hollow container having a receptacle configured to melt bulk metal and hold the melted metal and the container as a whole is configured for installation and removal in a 3D metal object printer. As used in this document, the term "vessel" means a hollow container having a receptacle configured to hold a melted or solid substance that may be configured for installation and removal from a 3D object metal printer. As used in this document, the term "bulk metal" means conductive metal available in aggregate form, such as wire of a commonly available gauge, macro-sized metal pellets, and metal powder.

With further reference to FIG. 1, a source of bulk metal 116, such as metal wire 120, is fed into a wire guide 124 that extends through the upper housing 122 in the ejector head 140 and melted in the receptacle of the removable vessel 104 to provide melted metal for ejection from the nozzle 108 through an orifice 110 in a baseplate 114 of the ejector head 140. As used in this document, the term "nozzle" means an orifice fluidically connected to a volume within a receptacle of a vessel containing melted metal that is configured for the expulsion of melted metal drops from the receptacle within the vessel. As used in this document, the term "ejector head" means the housing and components of a 3D metal object printer that melt, eject, and regulate the ejection of melted metal drops for the production of metal objects. A melted metal level sensor 184 includes a laser and a reflective sensor. The reflection of the laser off the melted metal level is detected by the reflective sensor, which generates a signal indicative of the distance to the melted metal level. The controller receives this signal and determines the level of the volume of melted metal in the removable vessel 104 so it can be maintained at an appropriate level 118 in the receptacle of the removable vessel. The removable vessel 104 slides into the heater 160 so the inside diameter of the heater contacts the removable vessel and can heat solid metal within the receptacle of the removable vessel to a temperature sufficient to melt the solid metal. As used in this document, the term "solid metal" means a metal as defined by the periodic chart of elements or alloys formed with these metals in solid rather than liquid or gaseous form. The heater is separated from the removable vessel to form a volume between the heater and the removable vessel 104. An inert gas supply 128 provides a pressure regulated source of an inert gas, such as argon, to the ejector head through a gas supply tube 132. The gas flows through the volume between the heater and the removable vessel and exits the ejector head around the nozzle 108 and the orifice 110 in the baseplate 114. This flow of inert gas proximate to the nozzle insulates the ejected drops of melted metal from the ambient air at the baseplate 114 to prevent the formation of metal oxide during the flight of the ejected drops. A gap between the nozzle and the surface on which an ejected metal drop lands is intentionally kept small enough that the inert gas exiting around the nozzle does not dissipate before the drop within this inert gas flow lands.

The ejector head 140 is movably mounted within Z-axis tracks for movement of the ejector head with respect to the platform 112. One or more actuators 144 are operatively connected to the ejector head 140 to move the ejector head along a Z-axis and are operatively connected to the platform 112 to move the platform in an X-Y plane beneath the ejector head 140. The actuators 144 are operated by a controller 148 to maintain an appropriate distance between the orifice 110 in the baseplate 114 of the ejector head 140 and a surface of an object on the platform 112.

Moving the platform 112 in the X-Y plane as drops of molten metal are ejected toward the platform 112 forms a swath of melted metal drops on the object being formed. Controller 148 also operates actuators 144 to adjust the distance between the ejector head 140 and the most recently formed layer on the substrate to facilitate formation of other structures on the object. While the molten metal 3D object printer 100 is depicted in FIG. 1 as being operated in a vertical orientation, other alternative orientations can be employed. Also, while the embodiment shown in FIG. 1 has a platform that moves in an X-Y plane and the ejector head moves along the Z axis, other arrangements are possible. For example, the actuators 144 can be configured to move the ejector head 140 in the X-Y plane and along the Z axis or they can be configured to move the platform 112 in both the X-Y plane and Z-axis.

A controller 148 operates the switches 152. One switch 152 can be selectively operated by the controller to provide electrical power from source 156 to the heater 160, while another switch 152 can be selectively operated by the controller to provide electrical power from another electrical source 156 to the coil 164 for generation of the electrical field that ejects a drop from the nozzle 108. Because the heater 160 generates a great deal of heat at high temperatures, the coil 164 is positioned within a chamber 168 formed by one (circular) or more walls (rectilinear shapes) of the ejector head 140. As used in this document, the term "chamber" means a volume contained within one or more walls within a metal drop ejecting printer in which a heater, a coil, and a removable vessel of a 3D metal object printer are located. The removable vessel 104 and the heater 160 are located within such a chamber. The chamber is fluidically connected to a fluid source 172 through a pump 176 and also fluidically connected to a heat exchanger 180. As used in this document, the term "fluid source" refers to a container of a liquid having properties useful for absorbing heat. The heat exchanger 180 is connected through a return to the fluid source 172. Fluid from the source 172 flows through the chamber to absorb heat from the coil 164 and the fluid carries the absorbed heat through the exchanger 180, where the heat is removed by known methods. The cooled fluid is returned to the fluid source 172 for further use in maintaining the temperature of the coil in an appropriate operational range.

The controller 148 of the 3D metal object printer 100 requires data from external sources to control the printer for metal object manufacture. In general, a three-dimensional model or other digital data model of the object to be formed is stored in a memory operatively connected to the controller 148. The controller can selectively access the digital data model through a server or the like, a remote database in which the digital data model is stored, or a computer-readable medium in which the digital data model is stored. This three-dimensional model or other digital data model is processed by a slicer implemented with a controller to generate machine-ready instructions for execution by the controller 148 in a known manner to operate the components of the printer 100 and form the layers of a metal object corresponding to the model. The generation of the machine-ready instructions can include the production of intermediate models, such as when a CAD model of the device is converted into an STL data model, a polygonal mesh, or other intermediate representation, which in turn can be processed to generate machine instructions, such as g-code, for fabrication of the object by the printer. As used in this document, the term "machine-ready instructions" means computer language commands that are executed by a computer, microprocessor, or controller to operate components of a 3D metal object additive manufacturing system to form metal objects on the platform 112. The controller 148 executes the machine-ready instructions to control the ejection of the melted metal drops from the nozzle 108, the positioning of the platform 112, as well as maintaining the distance between the orifice 110 and a surface of the object on the platform 112.

The controller 148 can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 136 from either a scanning system or an online or work station connection for processing and generation of the ejector head control signals output to the ejector head 104.

The controller 148 of FIG. 1 has been configured with programmed instructions that when executed by the controller cause the controller to form the overhang features of metal parts manufactured with the printer of FIG. 1 with roughness scores that are commensurate with the roughness scores of other features of the part that do not overhang. The controller is configured with these programmed instruction to perform three correction methods that improve the surface roughness measurements of overhanging features of the part being formed. These methods compensate for surface deviations differently than the methods used to compensate for surface deviations in non-overhanging features. The three methods are a semi-local correction technique that includes step-out based semi-local correction, restricted semi-local correction, and restricted semi-local correction with a trim amount. Surface roughness is measured by average roughness (Ra) and surface area roughness (Sa) for each semi-local correction performed and is compared to the local correction used for proximate non-overhanging features.

As used in this document, "step-out based semi-local correction" means modification of machine-ready instructions using gain map values that correspond to a straight segment of a step-out to be formed in a next layer. As used in this document, "restricted semi-local correction" means modification of machine-ready instructions using gain map values that correspond to a straight segment of a step-out from which curves have been filtered. As used in this document, "restricted semi-local correction with trim" means modification of machine-ready instructions using gain map values that correspond to a straight segment of a step-out from which a portion at one or more ends of the segment has been removed.

Before describing the methods used to compensate for surface deviations in overhanging features, the local correction method used for non-overhanging areas is noted. The surface deviations in any area of a part being manufactured are caused by random variations in ejected melted metal drop size, melted metal drop placement, melted metal drop temperature, and geometry of the part. If these deviations are not addressed the resulting height errors can accumulate to the extent that the part is unfit for its intended purpose. To maintain the dimensional integrity of the part, a local correction method is employed for non-overhanging areas. This method includes measuring the top surface height and adjusting the machine-ready instructions for producing subsequent layers to compensate for measured variations. The printer 100 includes a digital image data generator 188 that is operatively connected to the controller 148 and at least one of the actuators 144. The digital image data generator can be, for example, a digital camera that is aligned with a Z-axis or vertical direction in the printer 100. After a predetermined number of part layers are formed, which in one embodiment is five layers, the controller 148 operates one or more actuators 144 to move the camera 188 over the part and the camera generates image data of the uppermost layer of the part. The controller 148 receives the image data generated by the camera 188, compares it to the object model data, and generates a gain map to determine where and how much compensation is needed to correct Z-axis errors in the imaged layer. All non-overhanging features in the layer are treated the same and the same type of correction is applied to the non-overhanging features based on the gain map. Described in more detail below are methods that compensate for height errors in overhanging features using the gain map that are different than the ones used to correct the non-overhanging features.

Figure 2:
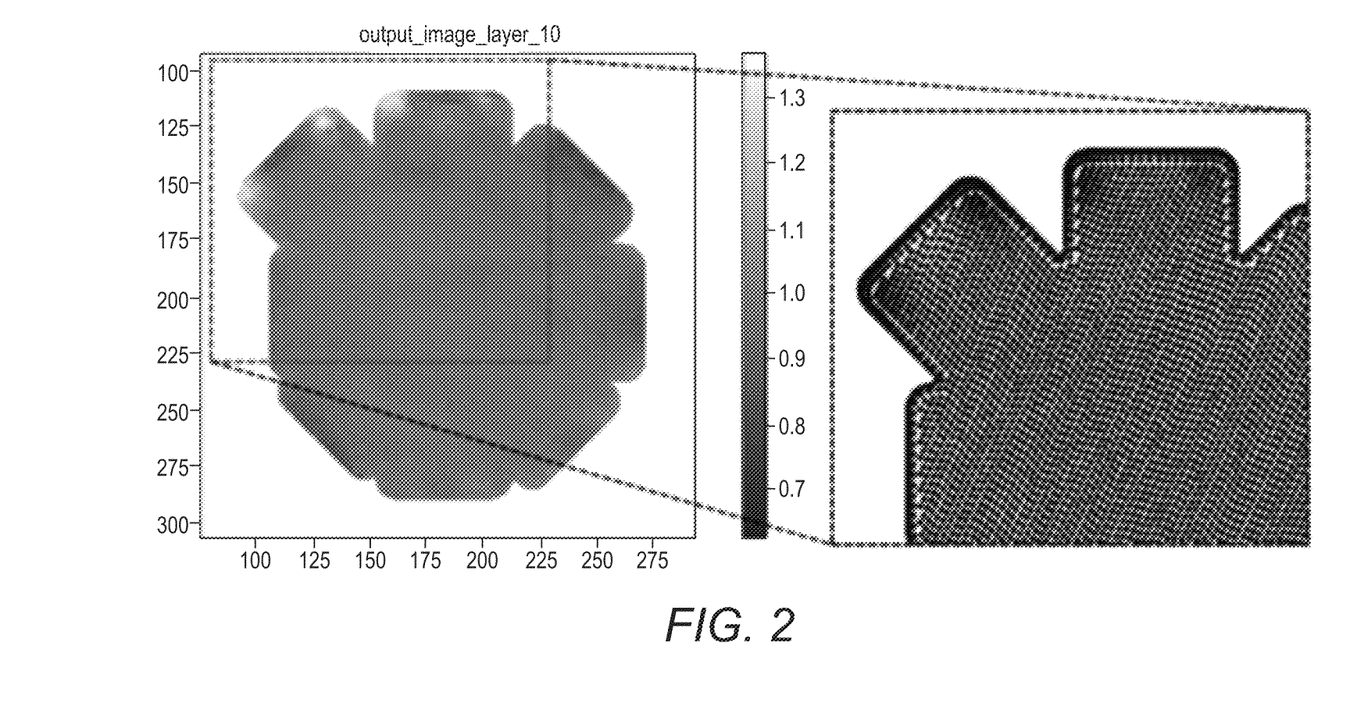
FIG. 2 depicts a view of an uppermost layer of a metal part being formed and the adjacent scale identifies the deviations in the uppermost layer that contribute to surface roughness. The expanded portion of that view shown in the figure is a depiction of a subsequent layer that compensates for the detected deviations.

As shown in FIG. 2, a gain map of the current top metal layer is generated using image data produced by the Z-axis aligned camera. The scale for the gain map is shown to the right of the gain map in FIG. 2. As used in this document, the term "gain map" means an array of metal drop locations in an uppermost layer of a metal object with a numerical representation at each metal drop location corresponding to a deviation between a height of the drop at the location in the layer and the expected height of the drop at that location. In this scale, the nominal gain value of 1 means the height of the drop is at its expected height so it has no effect on subsequent layers, a value greater than 1 means the height of the drop is less than its expected height so the number of drops at that position in subsequent layers needs to increase, and a value less than 1 means the height of the drop is greater that its expected height so the number of drops at that position in subsequent layers needs to decrease. The enlarged section shown in FIG. 2 is a subsequent layer as it is generated with the number of drops being increased in the regions corresponding to the gain image regions having a value greater than 1 and the number of drops being decreased in the regions corresponding to the gain image regions having a value less than 1. The number of drops can be altered by changing the drop spacing parameter in a machine-ready instruction.

Figure 3:
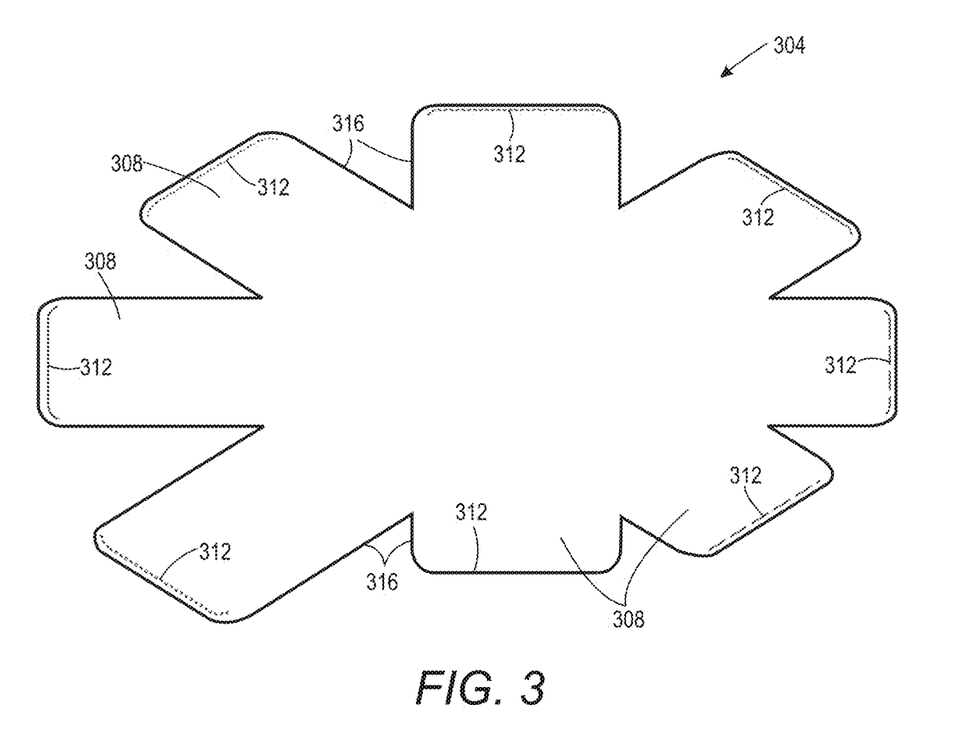
FIG. 3 depicts a layer of a part that has multiple arms with overhang features that vary in angles of deviation from the vertical from 45° to 62.5°.

The compensation methods used for overhanging features are directed to the edges for these features. The overhanging edge is determined with reference to an extra unsupported step-out pass of the melted metal drop ejector performed along the outer perimeter as described in co-pending patent application Ser. No. 17/159,975 filed on Jan. 27, 2021 and entitled "Method And Apparatus For Forming Overhang Structures With A Metal Drop Ejecting Three-Dimensional (3D) Object Printer." FIG. 3 shows a layer 304 of a part that has arms 308 with different angles of overhang edges 312 from the vertical that range from 45° to 62.5°. The continuous outline 316 is the perimeter of the layer and the lines 308 near the ends of each arm are the unsupported step-outs or overhang edges 308 that are formed to enable the overhangs to be constructed without requiring supports for their formation. These unsupported step-outs are locally corrected for each arm by taking the average of the gain map values corresponding to all of the melted metal drops in the overhanging edge from which an unsupported step-out extends and using that average to adjust the machine-ready instructions used to operate the ejector and form the unsupported step-outs so the unsupported step-outs compensate for the surface deviations in the edge of the overhanging features. Adjustments or modifications of machine-ready instructions includes changing parameters within the instructions, such as drop spacing or ejector head velocities.

The main drawback of this technique is that any overhanging feature having an angle from the horizontal that is greater than or equal to 45° has no unsupported step-outs and cannot be corrected semi-locally. Instead, those overhanging features are included in the normal local correction performed for the regions of the layer not located at the edge segments of the overhanging features. Additionally, for the corners of the overhangs that are subjected to the semi-local compensation performed for the unsupported step-outs, a pronounced drooping occurs. This drooping is due to each overhang edge's gain value being influenced by the middle of the edge segment where the surface deviations are 1 or greater than 1, which causes the compensation at the corners to be less than it should be to compensate for the surface deviations adequately.

Figure 4:
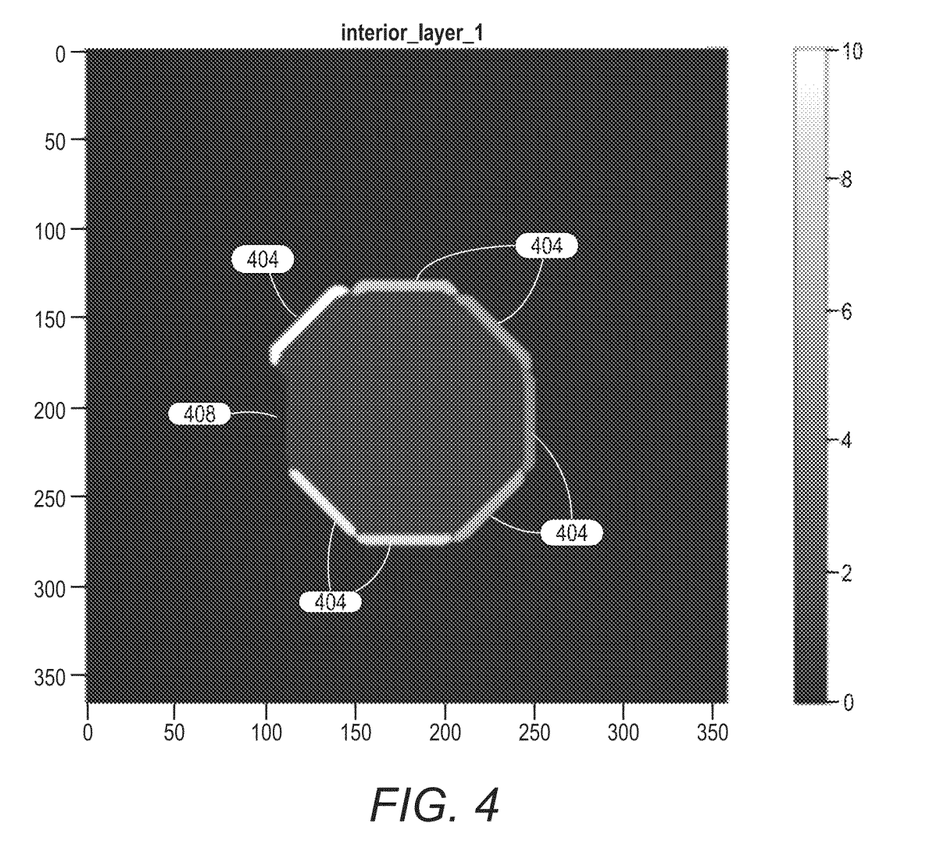
FIG. 4 shows the step-out based semi-local correction for each arm in FIG. 3 and the arm having a 45° overhang has no semi-local correction.
Figure 5:
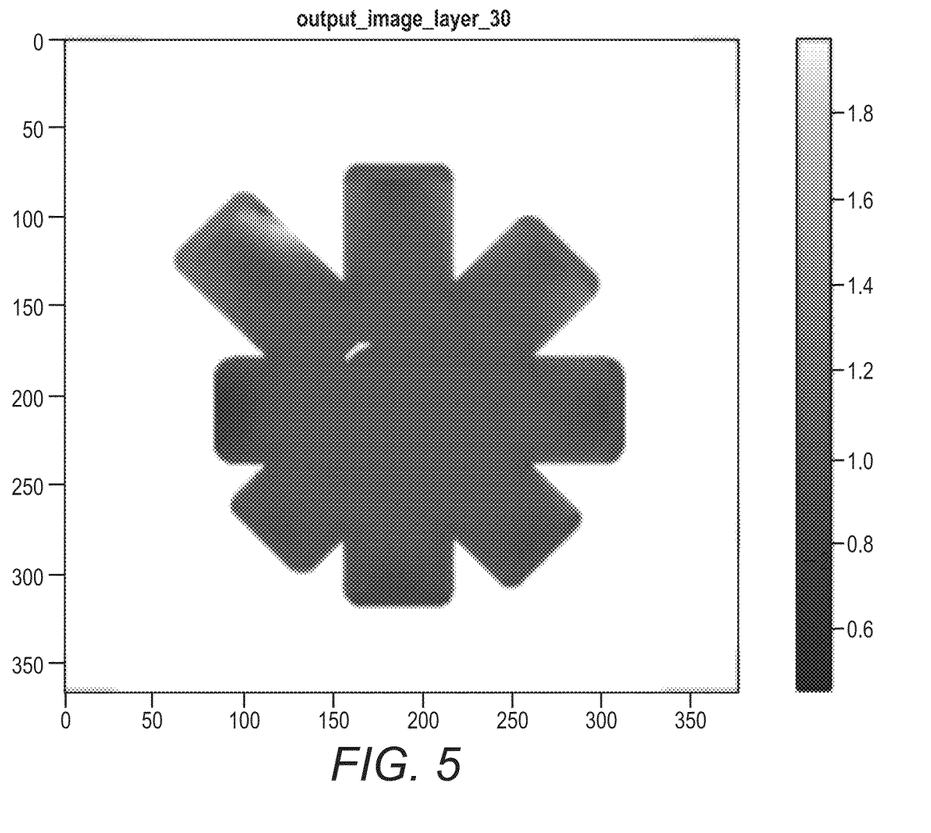
FIG. 5 shows the layer of FIG. 4 where the step-out based semi-local correction is applied to the overhang edge of each arm having an overhang angle that is greater than 45° and the correction is constant across the width of the arm at the overhang edge to avoid the roughness associated with changes in the drop spacing within the overhang edges.

FIG. 4 shows the step-out based semi-local correction for the overhang edges 404 of each arm except the arm having a 45° overhang 408 has no semi-local correction. FIG. 5 shows a layer of the same part where the step-out based semi-local correction is applied to the overhang edge of each arm having an overhang angle that is greater than 45° and the correction is constant across the width of the arm at the overhang edge to avoid the roughness associated with changes in the drop spacing within the overhang edges.

Figure 6:
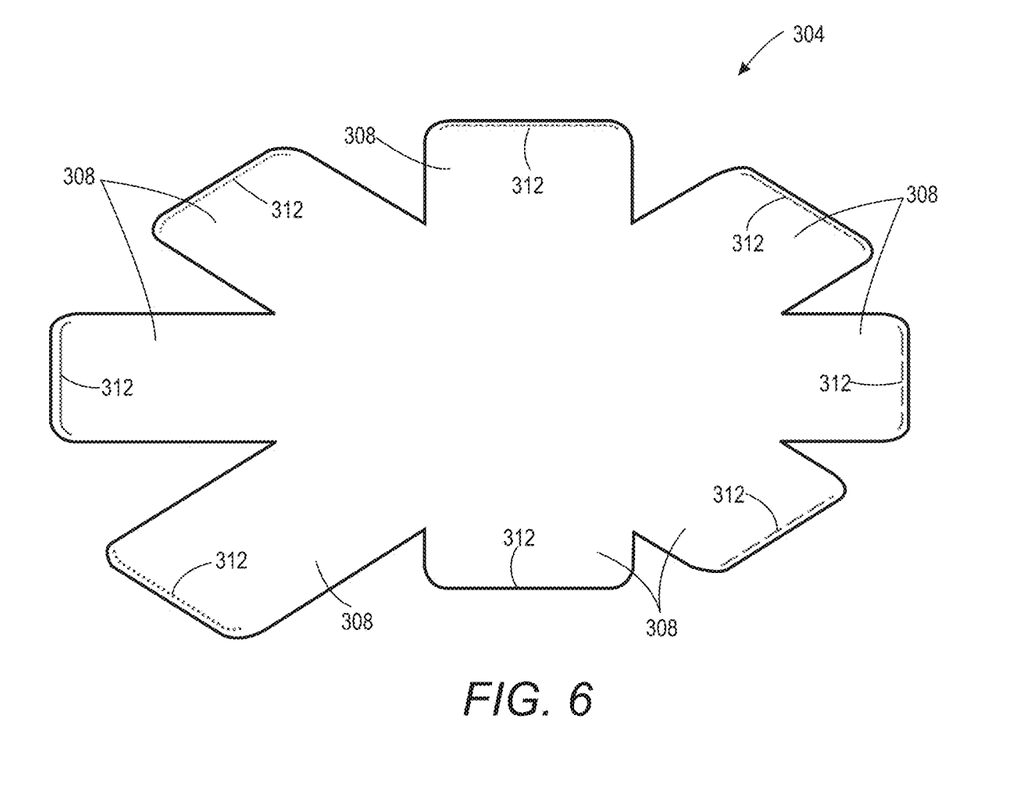
FIG. 6 depicts the layer of FIG. 3 in which the restricted semi-local correction method has been applied to the edge of the overhanging feature on each arm.

To overcome issues arising from corners in an unsupported step-out, a restricted semi-local correction method is used. In this method, the edges of the overhanging features where a step-out based semi-local correction is applied are determined using pulse distance and cartesian distance filtering. The pulse distance, sometimes called the drop spacing, is the distance between adjacent melted metal drops in the edge of an overhanging feature. The pulse distance at the edges of the overhanging features is smaller than the nominal distance between adjacent metal drops in non-overhanging areas of a layer. In one embodiment the nominal distance is 0.425 mm. Areas where the melted metal drops are separated by the nominal distance rather than the smaller pulse distance are filtered out of the edge segments for the overhanging features and included in the areas that are locally corrected. The cartesian distance is a predetermined segment length that is used to form curved corners in an edge. By detecting edge segments that are equal to or less than the cartesian distance the very small line segments used to form curved corners can be filtered from the edge segment before the restricted semi-local correction is applied. Again, the restricted semi-local correction method is only applied to the straight edges of the overhanging features where the drops are separated by the pulse distance and the corner segments are included in the non-overhanging areas that are locally corrected to avoid drooping. FIG. 6 depicts the layer 304 of FIG. 3 in which the restricted semi-local correction method has been applied. Now the overhang edge 312 for each arm 308 is identified for correction and the corners are not included in the semi-local correction. As a consequence, the 45° overhang edge is included in the semi-local edge corrections.

Figure 7:
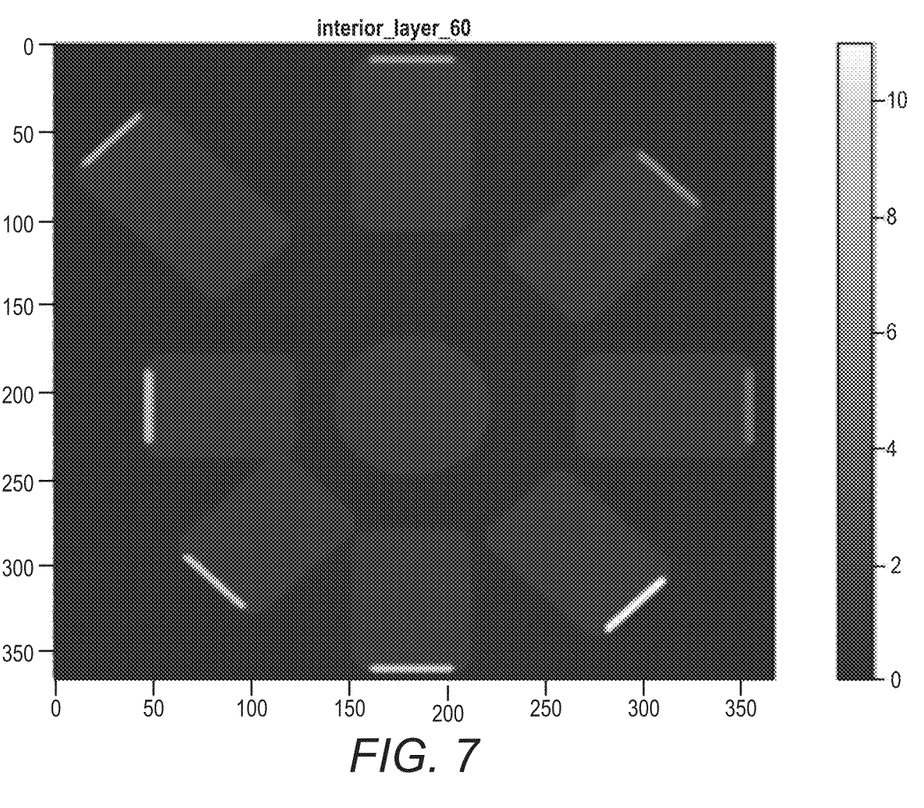
FIG. 7 shows the application of the restricted semi-local correction on the edge of the overhanging feature on each arm in FIG. 6.
Figure 8A:
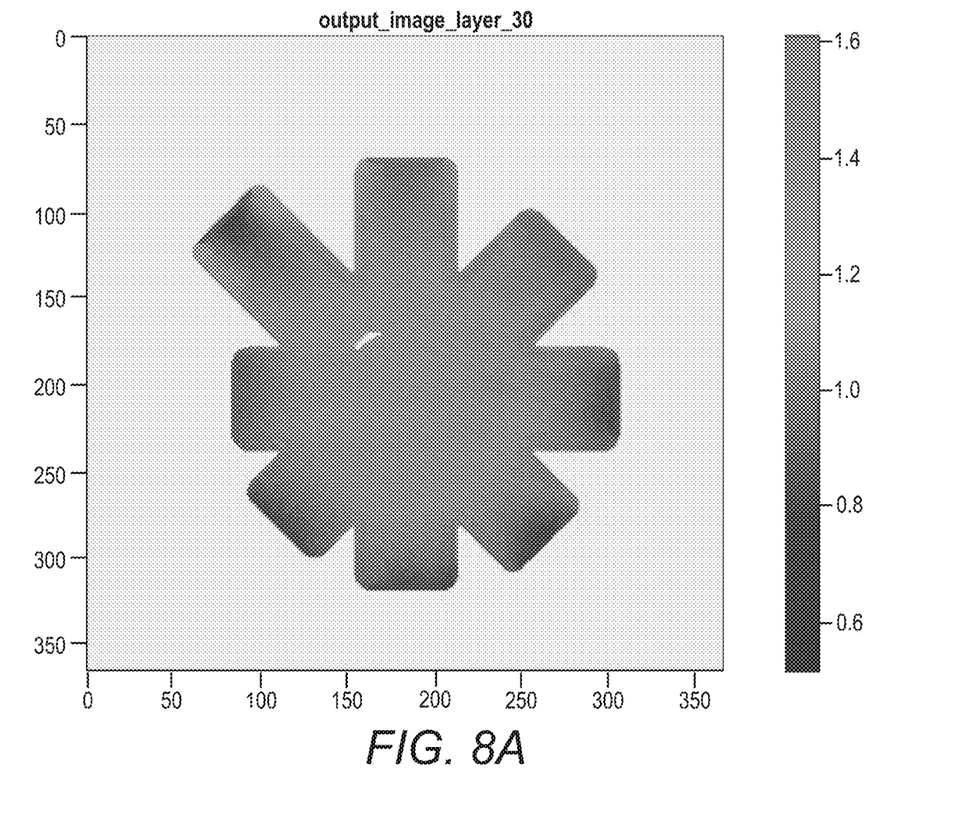
FIG. 8A is the gain map of the layer shown in FIG. 7 with restricted semi-local correction used at the edges of the overhanging feature on each arm and FIG. 8B is an enlarged portion of FIG. 8A.
Figure 8B:
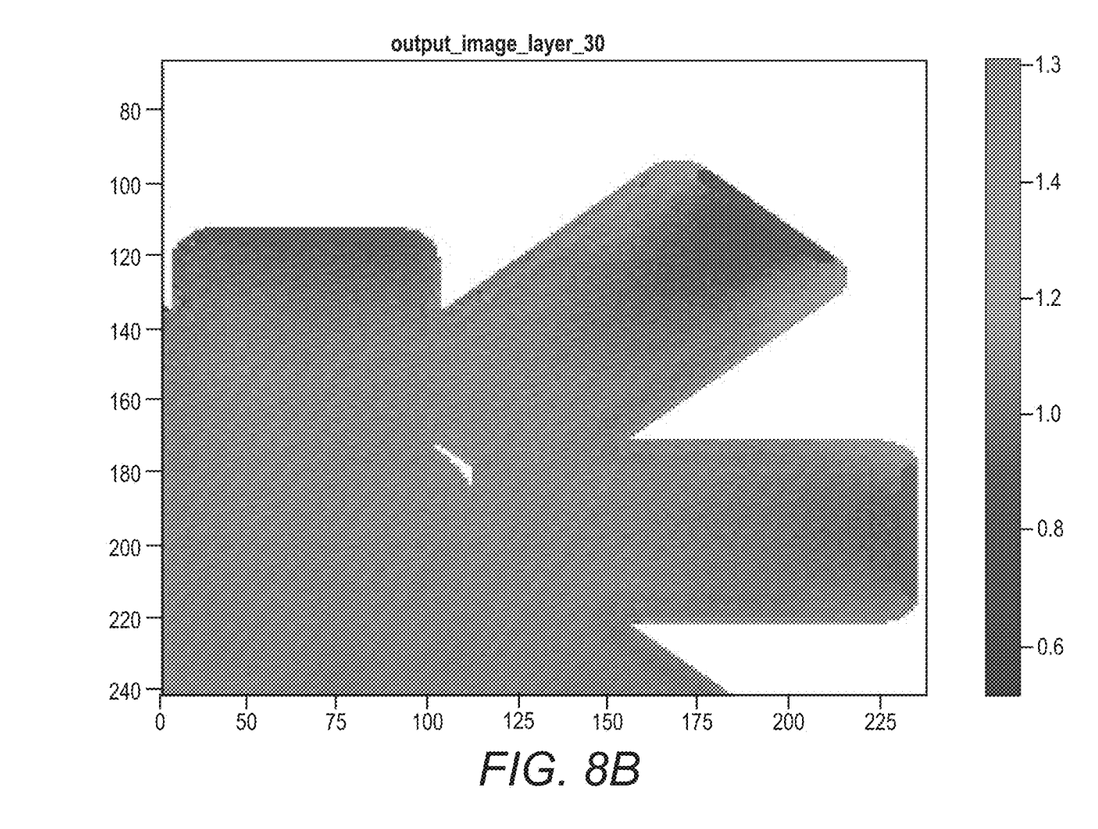

FIG. 7 shows the application of the restricted semi-local correction on the edge of the overhanging feature on each arm. The corrected gain value used in the formation of the offset in a subsequent layer is the average of all of the gain map values corresponding to the metal drops in the edge of the overhanging feature. For example, FIG. 8A is the gain map of the layer with restricted semi-local correction used at the edges of each overhanging feature for each arm and FIG. 8B is an enlarged portion of FIG. 8A. The enlarged image shows the gain values on some portion of the arms of the layer. The 45° overhang edge in this figure demonstrates that the semi-local correction of the overhanging feature edge blends well with the locally corrected non-overhanging portions in the image. In another embodiment, the restricted semi-local correction is determined with reference to a gain map value of 1 rather than an average of the gain map values for the edge. That is, no correction is performed where the gain map value is 1 and at the other locations where the value is not 1, the gain map value at those locations is used to determine a number of drops at the location in a subsequent layer.

An issue with the use of the restricted semi-local correction at the edges of overhanging features occurs where a sharp corner exists at one or both ends of the overhanging feature edge. Because the corner is sharp, it is not filtered out of the offset-based semi-local correction for the overhanging feature edge. Instead, the entire overhanging feature edge, including the sharp corner(s) is semi-locally corrected. Consequently, drooping can occur at the corner. To address this issue, an amount of the edge is trimmed from the end of the overhanging feature edge where the sharp corner occurs. This trim amount is a predetermined percentage of the total length of the overhanging feature edge and, in one embodiment, the predetermined percentage is 15% of the total length of the overhanging feature edge. Thus, with an overhanging feature edge having a sharp corner at each end of the edge, approximately 30% of the overhang edge is included in the local correction for the non-overhanging portion of the layer and is excluded from the offset-based semi-local correction for the overhanging feature edge. This description of the compensation techniques has referred to sharp and curved corners. As used in this document, the term "sharp corner" means a corner formed by two segments that are perpendicular to one another, while a "curved corner" is a corner formed by two or more segments that are positioned with respect to one another at any angle other than ninety degrees.

To evaluate the effectiveness of the offset-based semi-local method, restricted semi-local method, and the offset-based semi-local method with trim, the roughness of a surface is measured. Average roughness (Ra) is measured by taking the average of the absolute values of profile variations along an evaluation length. More exactly, Ra is the average of how far each point on the surface deviates in height from the mean height along the evaluation length. In 3D optical profilometry, roughness is usually stated as surface area roughness (Sa). Since Ra is usually determined along a line through an area, Sa can be determined as the average Ra for multiple lines through the same area. The average roughness or surface area roughness of different lines or areas of the overhanging features of an additively manufactured part can be compared to an average roughness or surface roughness of the non-overhanging surface areas. If the surface roughness measurement of the overhanging portions of the part are within a predetermined tolerance range about the surface roughness measurement of the non-overhanging areas, then the overhanging feature compensation technique is successful.

Figure 9:
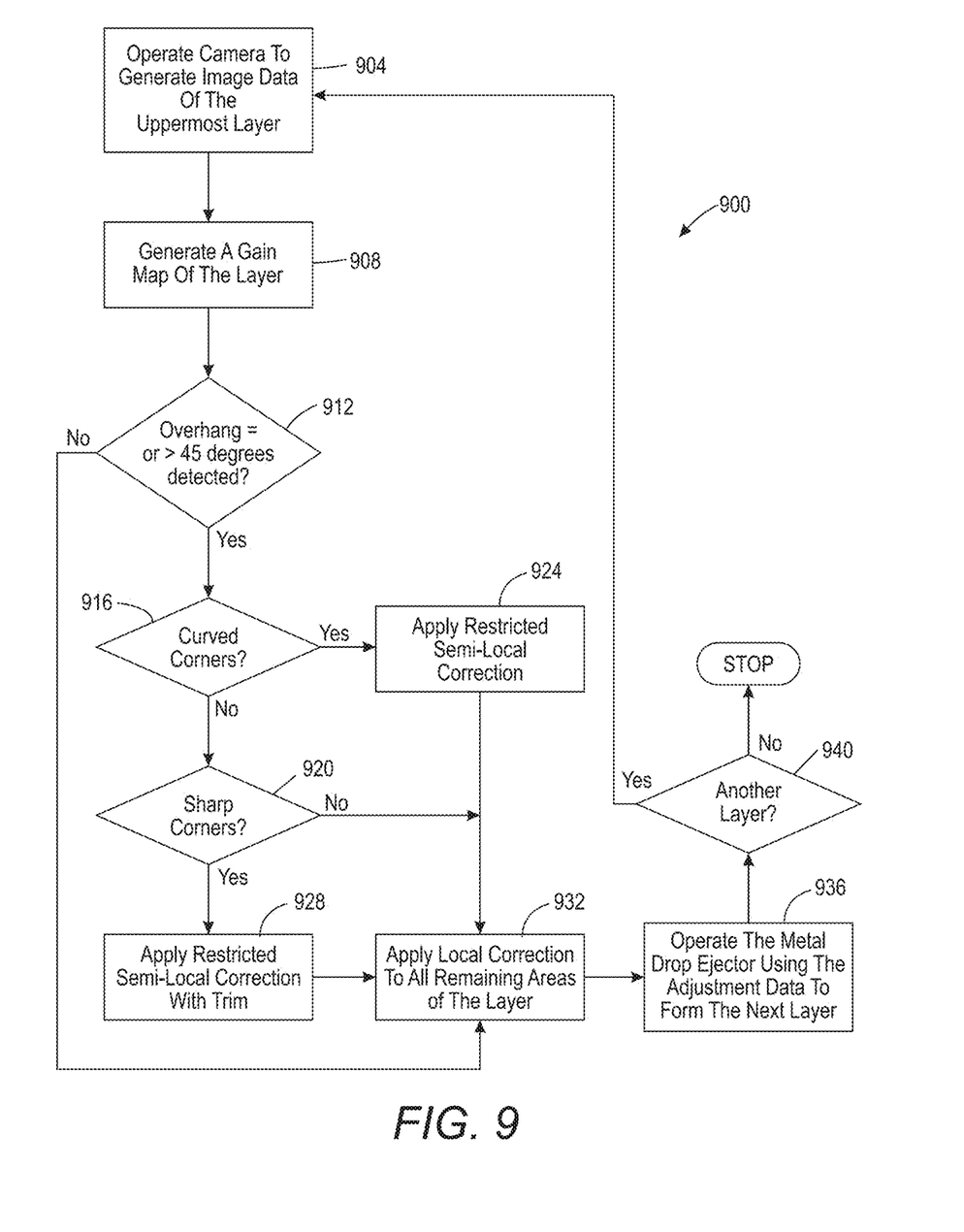
FIG. 9 is flow diagram of method for operating a 3D metal object printer that can form metal parts with 3D metal object printers that exhibit roughness scores for metal object overhangs that are within a tolerance about with roughness measurements for non-overhanging features of the part.

A process for operating a metal drop ejecting printer to form a part having step-outs for overhanging features having surface roughness measurements within a tolerance range about the surface roughness measurements for non-overhanging areas of the part is shown in FIG. 9. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 148 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 9 is a flow diagram of a process that operates a metal drop ejecting printer, such as printer 10, to form step-outs for overhanging features. The process 900 operates a digital camera oriented in the Z-axis or vertical direction to generate image data of an uppermost layer of an object being manufactured (block 904). A gain map of the layer is generated (block 908). For each overhang being constructed that has an angle of 45° or greater from the horizontal (block 912), the process determines whether the overhanging feature edge has curved (block 916) or sharp (block 920) corners. If the overhanging feature edge has a curved corner, then a restricted semi-local correction is applied to the machine-ready instructions used to operate the metal drop ejector to compensate for deviations in the surface at the overhanging feature edge (block 924). If the overhanging feature edge has a sharp corner, then a restricted semi-local correction with trim is applied to the machine-ready instructions used to operate the metal drop ejector to compensate for deviations in the surface at the overhanging feature edge (block 928). All other areas of the gain map are treated with a local area compensation method (block 932). After the machine-ready instructions used to operate the metal drop ejector to form the next layer have been adjusted by these different methods, the adjusted machine-ready instructions are used to operate the metal drop ejector and form the next layer of the part (block 936). After the next layer is formed, the process determines if another layer is to be formed (block 940), and if there is another layer, then the process continues (block 904). Otherwise, the process stops so the finished part can be removed.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. An additive manufacturing drop ejecting apparatus comprising:
    an ejector fluidly connected to a removable vessel configured to receive bulk metal and produce melted metal for ejection from the ejector;
    a digital camera aligned along a Z-axis in the additive manufacturing drop ejecting apparatus that is configured to generate digital image data of an uppermost layer of an object being formed with drops of the melted material ejected by the ejector; and
    a controller operatively connected to the ejector and the digital image data generator, the controller being configured to:
        modify machine-ready instructions used to operate the drop ejecting apparatus to form an overhanging feature of a next layer of the object using a step-out based semi-local correction method and the generated digital image data;

modify machine-ready instructions used to operate the drop ejecting apparatus to form a non-overhanging feature of the next layer of the object using a local correction method and the generated digital image data, the local correction method being different than the step-out based semi-local correction method;

generate a gain map using the generated digital image data, the step-out based semi-local correction method using a first portion of the gain map to identify changes to be made to the machine-ready instructions that form the overhanging feature and the local correction method using a second portion of the gain map to identify changes to be made to the machine-ready instructions that form the non-overhanging feature; and execute the modified machine-ready instructions to operate the drop ejecting apparatus to form the next layer of the object.

2. The apparatus of claim 1, the controller is further configured to:

average values in the first portion of the gain map to identify the changes to be made to the machine-ready instructions that form the overhanging feature.

3. An additive manufacturing drop ejecting apparatus comprising:

an ejector fluidly connected to a removable vessel configured to receive bulk metal and produce melted metal for ejection from the ejector;

a digital camera aligned along a Z-axis in the additive manufacturing drop ejecting apparatus that is configured to generate digital image data of an uppermost layer of an object being formed with drops of the melted material ejected by the ejector; and a controller operatively connected to the ejector and the digital image data generator, the controller being configured to:

modify machine-ready instructions used to operate the drop ejecting apparatus to form an overhanging feature of a next layer of the object using a restricted semi-local correction method and the generated digital image data;

modify machine-ready instructions used to operate the drop ejecting apparatus to form a non-overhanging feature of the next layer of the object using a second correction method and the generated digital image data, the second correction method being different than the restricted semi-local correction method;

generate a gain map using the generated digital image data, the restricted semi-local correction method using a first portion of the gain map to identify changes to be made to the machine-ready instructions that form the overhanging feature and the second correction method using a second portion of the gain map to identify changes to be made to the machine-ready instructions that form the non-overhanging feature; and execute the modified machine-ready instructions to operate the drop ejecting apparatus to form the next layer of the object.

4. The apparatus of claim 3, the controller is further configured to:

filter portions from the first portion of the gain map before the changes are identified.

5. An additive manufacturing drop ejecting apparatus comprising:

an ejector fluidly connected to a removable vessel configured to receive bulk metal and produce melted metal for ejection from the ejector;

a digital camera aligned along a Z-axis in the additive manufacturing drop ejecting apparatus that is configured to generate digital image data of an uppermost layer of an object being formed with drops of the melted material ejected by the ejector; and a controller operatively connected to the ejector and the digital image data generator, the controller being configured to:

modify machine-ready instructions used to operate the drop ejecting apparatus to form an overhanging feature of a next layer of the object using a restricted semi-local correction method with trim and the generated digital image data;

modify machine-ready instructions used to operate the drop ejecting apparatus to form a non-overhanging feature of the next layer of the object using a second correction method and the generated digital image data, the second correction method being different than the restricted semi-local correction method with trim;

generate a gain map using the generated digital image data, the restricted semi-local correction method with trim using a first portion of the gain map to identify changes to be made to the machine-ready instructions that form the overhanging feature and the second correction method using a second portion of the gain map to identify changes to be made to the machine-ready instructions that form the non-overhanging feature; and execute the modified machine-ready instructions to operate the drop ejecting apparatus to form the next layer of the object.

6. The apparatus of claim 5, the controller being further configured to:

remove at least one end of the first portion of the gain map from the first portion before the changes are identified.

7. The apparatus of claim 6, the controller being further configured to:

remove a predetermined percentage of a length of the first portion.

8. An additive manufacturing drop ejecting apparatus comprising:

an ejector fluidly connected to a removable vessel configured to receive bulk metal and produce melted metal for ejection from the ejector;

a digital camera aligned along a Z-axis in the additive manufacturing drop ejecting apparatus that is configured to generate digital image data of an uppermost layer of an object being formed with drops of the melted material ejected by the ejector; and a controller operatively connected to the ejector and the digital image data generator, the controller being configured to:

generate a gain map using the generated digital image data;

modify machine-ready instructions used to operate the drop ejecting apparatus to form an overhanging feature of a next layer of the object using a first correction method and a first portion of the gain map to identify changes to be made to the machine-ready instructions that form the overhanging feature, the first correction method being one of a step-out based semi-local correction method and a restricted semi-local correction method;

modify machine-ready instructions used to operate the drop ejecting apparatus to form a non-overhanging feature of the next layer of the object using a second correction method and a second portion of the gain map to identify changes to be made to the machine-ready instructions that form the non-overhanging feature, the second correction method being different than the first correction method and the second correction method being a local correction method; and execute the modified machine-ready instructions to operate the drop ejecting apparatus to form the next layer of the object.

9. The apparatus of claim 8, the controller begin further configured to:

average values in the first portion of the gain map to identify the changes to be made to the machine-ready instructions that form the overhanging feature.

10. The apparatus of claim 8, the controller is further configured to:

filter portions from the first portion of the gain map before the changes are identified.

11. An additive manufacturing drop ejecting apparatus comprising:

an ejector fluidly connected to a removable vessel configured to receive bulk metal and produce melted metal for ejection from the ejector;

a digital camera aligned along a Z-axis in the additive manufacturing drop ejecting apparatus that is configured to generate digital image data of an uppermost layer of an object being formed with drops of the melted material ejected by the ejector; and a controller operatively connected to the ejector and the digital image data generator, the controller being configured to:

generate a gain map using the generated digital image data;

modify machine-ready instructions used to operate the drop ejecting apparatus to form an overhanging feature of a next layer of the object using a first correction method and a first portion of the gain map to identify changes to be made to the machine-ready instructions that form the overhanging feature, the first correction method being a restricted semi-local correction method with trim;

modify machine-ready instructions used to operate the drop ejecting apparatus to form a non-overhanging feature of the next layer of the object using a second correction method and a second portion of the gain map to identify changes to be made to the machine-ready instructions that form the non-overhanging feature, the second correction method being different than the first correction method and the second correction method being a local correction method; and execute the modified machine-ready instructions to operate the drop ejecting apparatus to form the next layer of the object.

12. The apparatus of claim 11, the controller being further configured to:

remove at least one end of the first portion of the gain map from the first portion before the changes are identified.

13. The apparatus of claim 12, the controller being further configured to:

remove a predetermined percentage of a length of the first portion.

\* \* \* \* \*